United States Patent
Yamaguchi et al.

(10) Patent No.: US 7,774,120 B2
(45) Date of Patent: Aug. 10, 2010

(54) CONTROL APPARATUS FOR CONTINUOUSLY-VARIABLE TRANSMISSION OF VEHICLE

(75) Inventors: Midori Yamaguchi, Yokohama (JP); Yoshihisa Kodama, Yokohama (JP); Tatsuya Ozone, Kanagawa (JP); Toshiji Iida, Kanagawa (JP); Fumito Shinohara, Kanagawa (JP); Toshiyuki Shibuya, Kanagawa (JP); Atsufumi Kobayashi, Kanagawa (JP); Yusuke Kimura, Yokohama (JP)

(73) Assignee: JATCO Ltd, Fuji-shi (JP)

( * ) Notice: Subject to any disclaimer, the term of this patent is extended or adjusted under 35 U.S.C. 154(b) by 786 days.

(21) Appl. No.: 11/589,221

(22) Filed: Oct. 30, 2006

(65) Prior Publication Data
US 2007/0099754 A1    May 3, 2007

(30) Foreign Application Priority Data
Oct. 31, 2005    (JP)    ............... 2005-317645

(51) Int. Cl.
*F16H 59/68*    (2006.01)
(52) U.S. Cl. ............... 701/61; 477/46; 477/50
(58) Field of Classification Search .............. 477/46, 477/50; 701/58–61
See application file for complete search history.

(56) References Cited

U.S. PATENT DOCUMENTS

| | | | |
|---|---|---|---|
| 4,536,171 A | 8/1985 | Tanaka et al. | |
| 4,603,602 A * | 8/1986 | Tanaka et al. | ............... 477/49 |
| 4,669,336 A | 6/1987 | Okada et al. | |
| 4,672,864 A | 6/1987 | Morimoto | |
| 4,674,363 A | 6/1987 | Miyawaki | |
| 4,708,031 A | 11/1987 | Morimoto et al. | |
| 4,759,236 A | 7/1988 | Tezuka et al. | |
| 4,829,433 A | 5/1989 | Nakano et al. | |
| 4,846,765 A | 7/1989 | Sakai | |

(Continued)

FOREIGN PATENT DOCUMENTS

DE    36 34 166 A1    4/1987

(Continued)

OTHER PUBLICATIONS

M. Yamaguchi, U.S. PTO Office Action, 11/589,242, Dec. 26, 2008, 25 pages.

(Continued)

*Primary Examiner*—Roger L Pang
*Assistant Examiner*—Derek D Knight
(74) *Attorney, Agent, or Firm*—Foley & Lardner LLP

(57) ABSTRACT

A control apparatus for an automatic transmission includes a control section having a normal control section configured to actuate the step motor at a first speed by using a feedback control including an integral control in accordance with the target pulley ratio and the actual pulley ratio, a high speed control section configured to actuate the step motor at a second speed higher than the first speed by an open loop control based on the target pulley ratio, a judgment section configured to judge whether there is a high speed operation request, and a switch section configured to select the normal control performed by the normal control section at a normal condition, and to switch to the high speed control when a switch start condition is satisfied, the switch start condition including a first condition that the judgment section judges there is the high speed operation request.

9 Claims, 7 Drawing Sheets

U.S. PATENT DOCUMENTS

| | | |
|---|---|---|
| 4,853,858 A | 8/1989 | Kumura |
| 4,993,284 A | 2/1991 | Oshiage |
| 5,720,692 A | 2/1998 | Kashiwabara |
| 5,924,539 A | 7/1999 | Braun et al. |
| 6,561,934 B2 | 5/2003 | Kashiwase |
| 6,569,044 B1 | 5/2003 | Sen et al. |
| 6,721,643 B1 | 4/2004 | Hanggi et al. |
| 2003/0158009 A1 | 8/2003 | Berger et al. |
| 2003/0158646 A1 | 8/2003 | Nishida et al. |
| 2004/0059489 A1 | 3/2004 | Hanggi et al. |
| 2004/0162183 A1 | 8/2004 | Wakahara et al. |

FOREIGN PATENT DOCUMENTS

| | | |
|---|---|---|
| DE | 38 44 871 C2 | 1/2001 |
| EP | 0 093 413 A1 | 11/1983 |
| EP | 0 117 264 A1 | 9/1984 |
| EP | 0 140 228 A1 | 5/1985 |
| EP | 0 892 196 A2 | 1/1999 |
| EP | 0 899 482 A2 | 3/1999 |
| EP | 0 899 486 A2 | 3/1999 |
| EP | 1 396 665 A2 | 3/2004 |
| EP | 1 403 560 A2 | 3/2004 |
| EP | 1 403 570 A2 | 3/2004 |

OTHER PUBLICATIONS

U.S. Appl. No. 11/589,242, filed Oct. 30, 2006, Yamaguchi et al.
Midori Yamagushi et al., US PTO Office Action, 11/589,242, Jun. 24, 2009, 22 pages.
M. Yamaguchi, U.S. PTO Office Action, Serial No. 11/589,242, dated Nov. 12, 2009, 25 pages.
M. Yamaguchi, U.S. PTO Office Action, U.S. Appl. No. 11/589,242, dated Mar. 9, 2010, 26 pages.

\* cited by examiner

CONTROL APPARATUS FOR CONTINUOUSLY-VARIABLE TRANSMISSION OF VEHICLE

BACKGROUND OF THE INVENTION

The present invention relates to a control apparatus for an automatic transmission of a vehicle which is configured to control a transmission gear ratio by using a hydraulic pressure of a hydraulic fluid.

A belt-type continuously-variable transmission includes a primary pulley (driving pulley), a secondary pulley (driven pulley), and a belt wound around the primary pulley and the secondary pulley. The primary pulley includes a fixed pulley (sheave) integrally formed with a shaft (primary shaft) serving as a rotation axis, and a movable pulley (slidable sheave) arranged to be moved in an axial direction of the primary shaft, and located at a position to confront the fixed pulley of the primary pulley. The secondary pulley includes a fixed pulley (sheave) integrally formed with a shaft (secondary shaft) serving as a rotation axis, and a movable pulley (sheave) arranged to be moved in an axial direction of the secondary shaft, and located at a position to confront the fixed pulley of the secondary pulley. The belt is contacted, under pressure, with a V-shaped groove defined by the fixed pulley and the movable pulley of the primary pulley, and with a V-shaped groove defined by the fixed pulley and the movable pulley of the secondary pulley, and accordingly power transmission is performed by the compressive contact between the belt and each of the primary and the secondary pulley.

The movable pulley of the primary pulley is arranged to move axially toward or move axially apart from the fixed pulley of the primary pulley by regulating a hydraulic pressure within a hydraulic chamber formed on a back surface (or rear surface) of the movable pulley of the primary pulley. The movable pulley of the secondary pulley is arranged to move axially toward or move axially apart from the fixed pulley of the secondary pulley by regulating a hydraulic pressure within a hydraulic chamber formed on a back surface (or rear surface) of the movable pulley of the secondary pulley. This movements (stroke displacement) of the movable pulleys varies groove widths of the V-shaped grooves respectively, and adjust effective radiuses of rotation of the primary and secondary pulleys. Consequently, it is possible to vary a power transmission ratio from the primary pulley to the secondary pulley in a stepless manner.

In a case in which a transmission gear ratio (pulley ratio) is increased (that is, in a case in which the transmission gear ratio is shifted to a low side), the hydraulic pressure (an actual secondary pressure) of the hydraulic chamber of the secondary pulley is increased to move the movable pulley of the secondary pulley toward the fixed pulley of the secondary pulley. Consequently, the groove width of the V-shaped groove of the secondary pulley is decreased, and the effective radius of the rotation of the secondary pulley is increased. In this state, the radius of the rotation of the primary pulley is decreased as the radius of the rotation of the secondary pulley is increased because length of the belt does not vary, so that it is possible to increase the pulley ratio.

In the conventional belt-type continuously-variable transmission, at the shift, a target pulley ratio is first set in accordance with a vehicle speed and a throttle opening (TVO). A target time constant (a constant which correlates to a shift speed, and which is appropriately adjusted) is set at each of an upshift, a downshift, and a depression-induced downshift (downshift accompanying a driver's depression). The target pulley ratio is delayed by the target time constant at the first order, and is set to a transient target pulley ratio (the target pulley ratio at a transient of the shift). The control apparatus performs a feedback control based on the target pulley ratio and the actual pulley ratio. In this way, the feed back control is performed so that the target pulley ratio is not set directly to a target value, and that the target pulley ratio with the first-order delay is set to the target value. When the actual pulley ratio at a start of the shift is varied to the target pulley ratio, the actual pulley ratio is substantially linearly varied in the range of the shift speed at a normal control. Accordingly, the target value at the feedback control is linearly varied in accordance with the variation in the actual pulley ratio, and it is possible to compensate following ability of the actual pulley ratio with respect to the target pulley ratio, and to perform the smooth shift corresponding to the variation of the actual pulley ratio.

SUMMARY OF THE INVENTION

Incidentally, in a case such as the depression-induced downshift at which rapid acceleration is required, it is desired that an acceleration response is further improved. For improving this acceleration response, it is requested to improve a shift response from the accelerator pedal depression until the actual pulley ratio is varied to the target pulley ratio. To improve the shift response, the shift speed (corresponding to a pulley stroke speed in the belt-type continuously-variable transmission) at the change of the pulley ratio may be set greater than the shift speed of the conventional transmission, so that the actual pulley ratio is rapidly shifted to the target pulley ratio.

However, in a case in which the shift speed is increased than the normal speed, rate of change of the actual pulley ratio is gradually decreased. The rate of the change of the actual pulley ratio is small at the start of the shift, is gradually increased during the shift, and is gradually decreased in the vicinity of the termination of the shift, as shown in FIG. 8. Thereby, in a case in which the feedback control operation including an integral term is performed in accordance with the actual pulley ratio and the target pulley ratio delayed by the first-order in accordance with the time constant as the conventional control system, the transient target pulley ratio is extremely large at the start of the shift, relative to the actual pulley ratio. Consequently, the transient target pulley ratio is set to further large value. Therefore, the actual pulley ratio becomes larger than the target pulley ratio, and the transmission gear ratio is largely overshot.

It is, therefore, an object of the present invention to provide a control apparatus for a continuously-variable transmission for a vehicle devised to decrease an overshoot of a transmission gear ratio even when a shift speed at a shift is increased.

According to one aspect of the present invention, a control apparatus for an automatic transmission of a vehicle, the control apparatus comprises: a primary pulley including a movable pulley, the primary pulley being connected with an input; a secondary pulley including a movable pulley, the secondary pulley being connected with an output; a belt wound around the primary pulley and the secondary pulley; a shift control valve configured to regulate a hydraulic pressure acting on the movable pulley of the primary pulley; a step motor configured to be moved to a position in accordance with a target pulley ratio between the primary pulley and the secondary pulley; a servo link connected with the step motor, the movable pulley of the primary pulley, and the shift control valve, and arranged to move the movable pulley of the primary pulley through the shift control valve in accordance with the position of the step motor; an actual pulley ratio sensing section configured to sense or determine the actual pulley ratio between the primary pulley and the secondary pulley; and a control section configured to control the step motor in accordance with the target pulley ratio and an actual pulley ratio sensed by the actual pulley ratio sensing section, the control section including; a target pulley ratio setting section configured to set the target pulley ratio; a normal control section configured to perform a normal control to actuate the step motor at a first speed by using a feedback control including an integral control in accordance with the target pulley ratio and the actual pulley ratio; a high speed control section configured to perform a high speed control to actuate the step motor at a second speed higher than the first speed by an open loop control based on the target pulley ratio; a judgment section configured to judge whether there is a high speed operation request to perform a shift operation at a high speed; and a switch section configured to select the normal control performed by the normal control section at a normal condition, and to switch to the high speed control performed by the high speed control section when a switch start condition is satisfied, the switch start condition including a first condition that the judgment section judges there is the high speed operation request.

According to another aspect of the invention, a control method for an automatic transmission of a vehicle including: a primary pulley including a movable pulley, the primary pulley being connected with an input, a secondary pulley including a movable pulley, the secondary pulley being connected with an output, a belt wound around the primary pulley and the secondary pulley, a shift control valve configured to regulate a hydraulic pressure acting on the movable pulley of the primary pulley, a step motor configured to be moved to a position in accordance with a target pulley ratio between the primary pulley and the secondary pulley, a servo link connected with the step motor, the movable pulley of the primary pulley, and the shift control valve, and arranged to move the movable pulley of the primary pulley through the shift control valve in accordance with the position of the step motor, and an actual pulley ratio sensing section configured to sense the actual pulley ratio between the primary pulley and the secondary pulley, the control method comprises: controlling the step motor in accordance with the target pulley ratio and an actual pulley ratio sensed by the actual pulley ratio sensing section; setting the target pulley ratio; performing a normal control to actuate the step motor at a first speed by using a feedback control including an integral control in accordance with the target pulley ratio and the actual pulley ratio; performing a high speed control to actuate the step motor at a second speed higher than the first speed by an open loop control based on the target pulley ratio; judging whether there is a high speed operation request to perform a shift operation at a high speed; and selecting the normal control performed by the normal control section at a normal condition, and to switch to the high speed control performed by the high speed control section when a switch start condition is satisfied, the switch start condition including a first condition that the judgment section judges there is the high speed operation request.

DETAILED DESCRIPTION OF THE INVENTION

Figure 1:
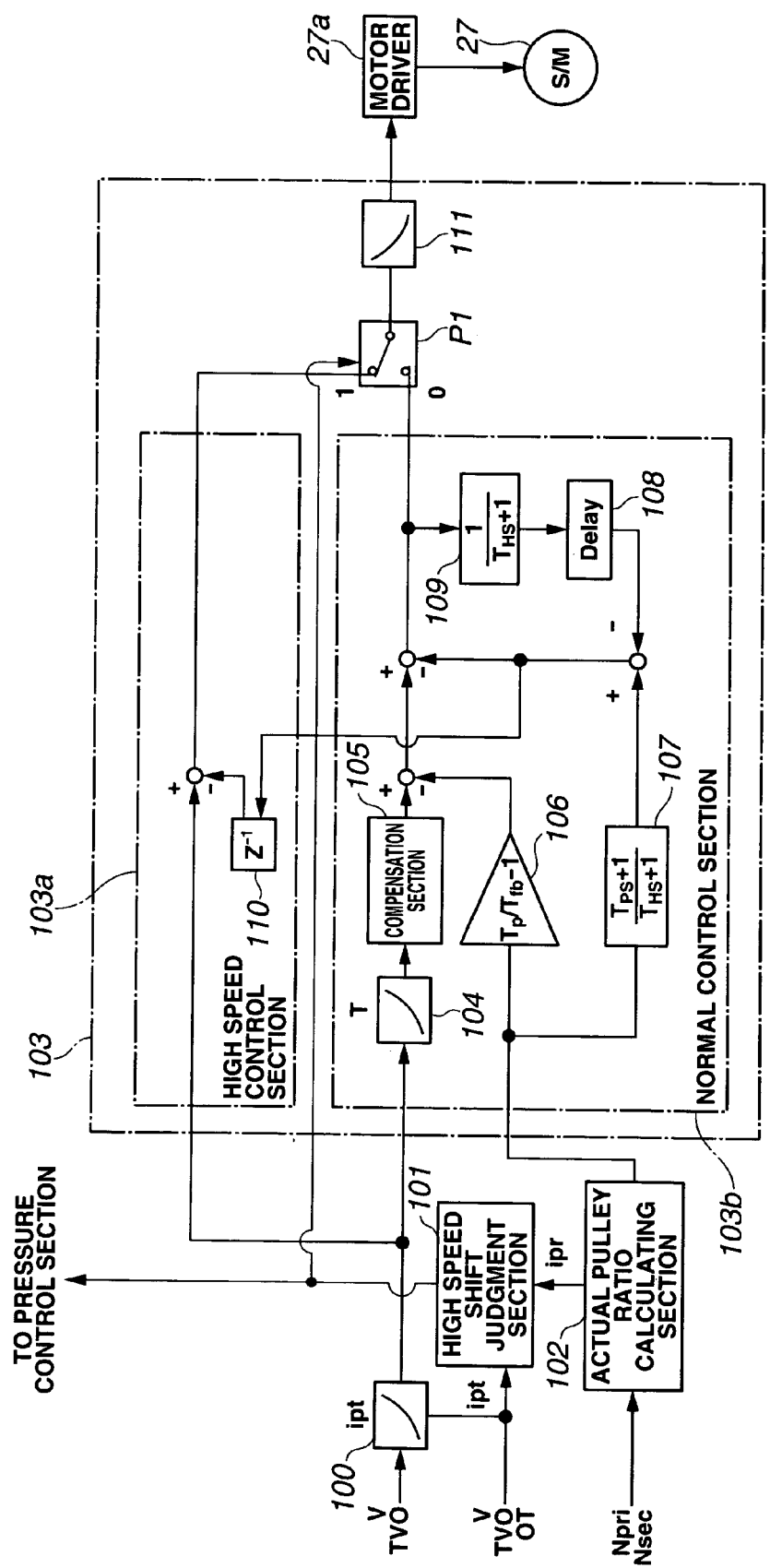
FIG. 1 is a control block diagram showing a shift control section of a control apparatus which is configured to calculate a target secondary pressure for a belt-type continuously-variable transmission according to an embodiment of the present invention.
Figure 2:
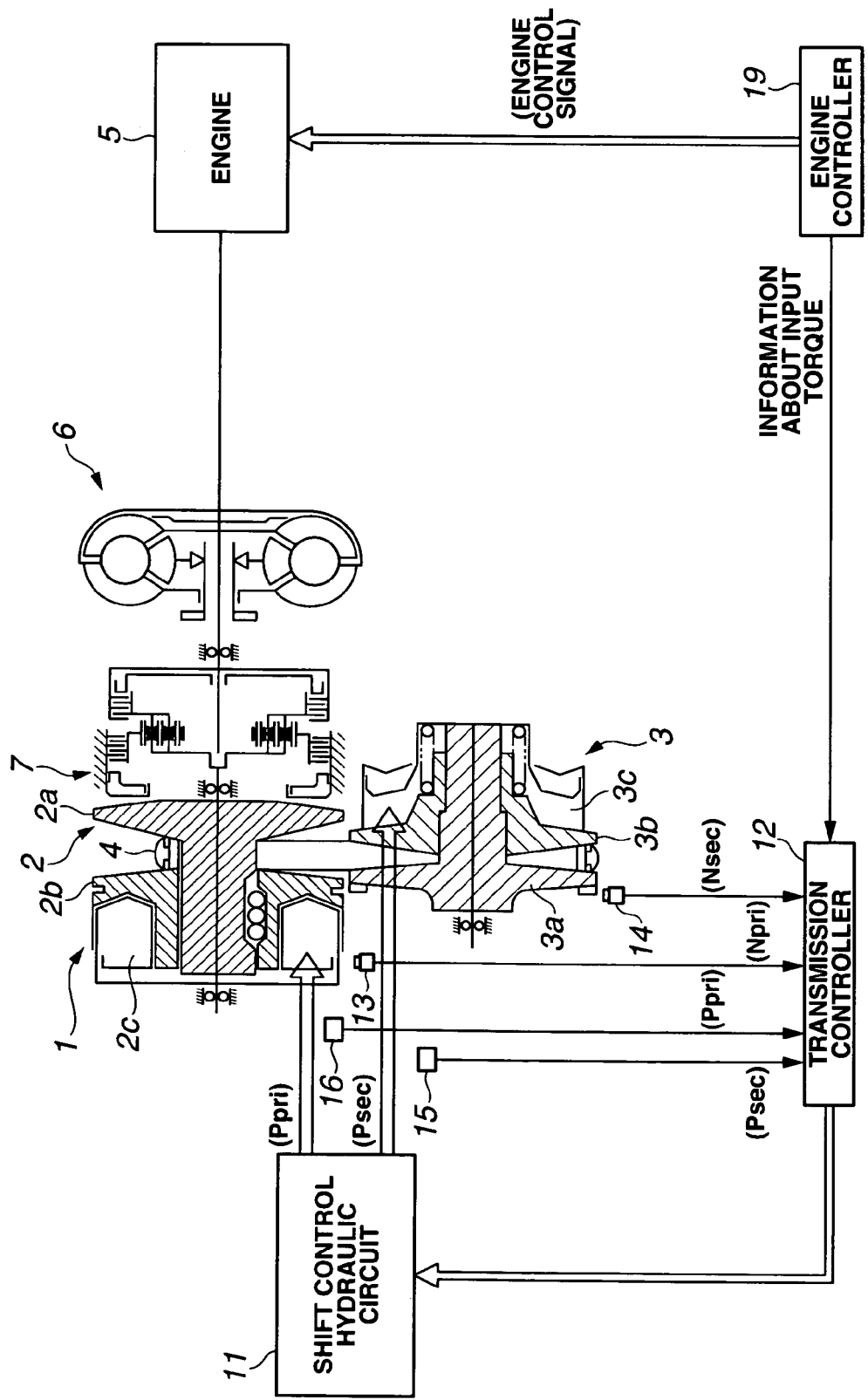
FIG. 2 is a block diagram showing the continuously-variable transmission according to the embodiment of the present invention, and a shift control system of the continuously-variable transmission.
Figure 3:
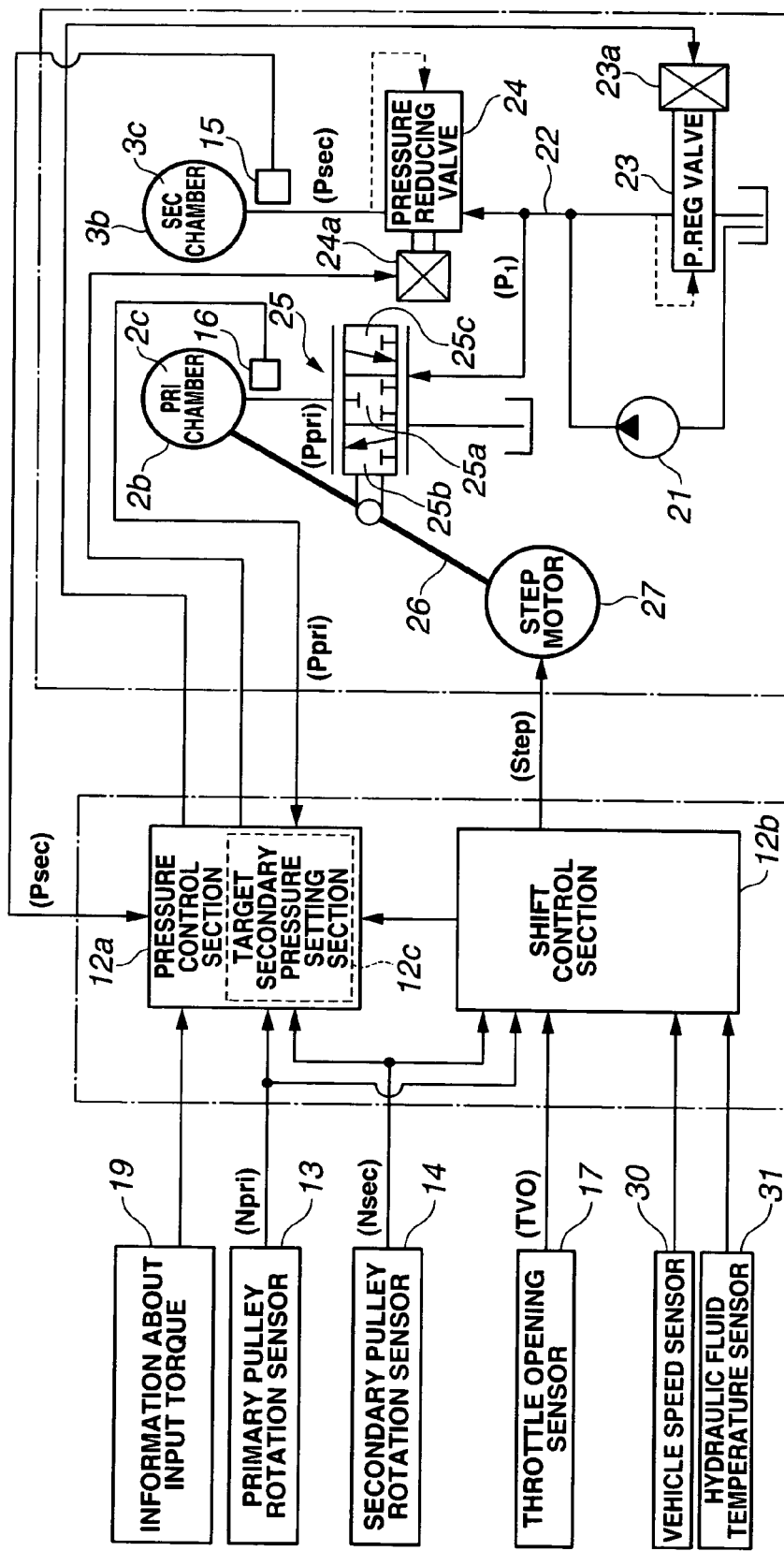
FIG. 3 is a block diagram showing the shift control system of the continuously-variable transmission of FIG. 2.
Figure 4:
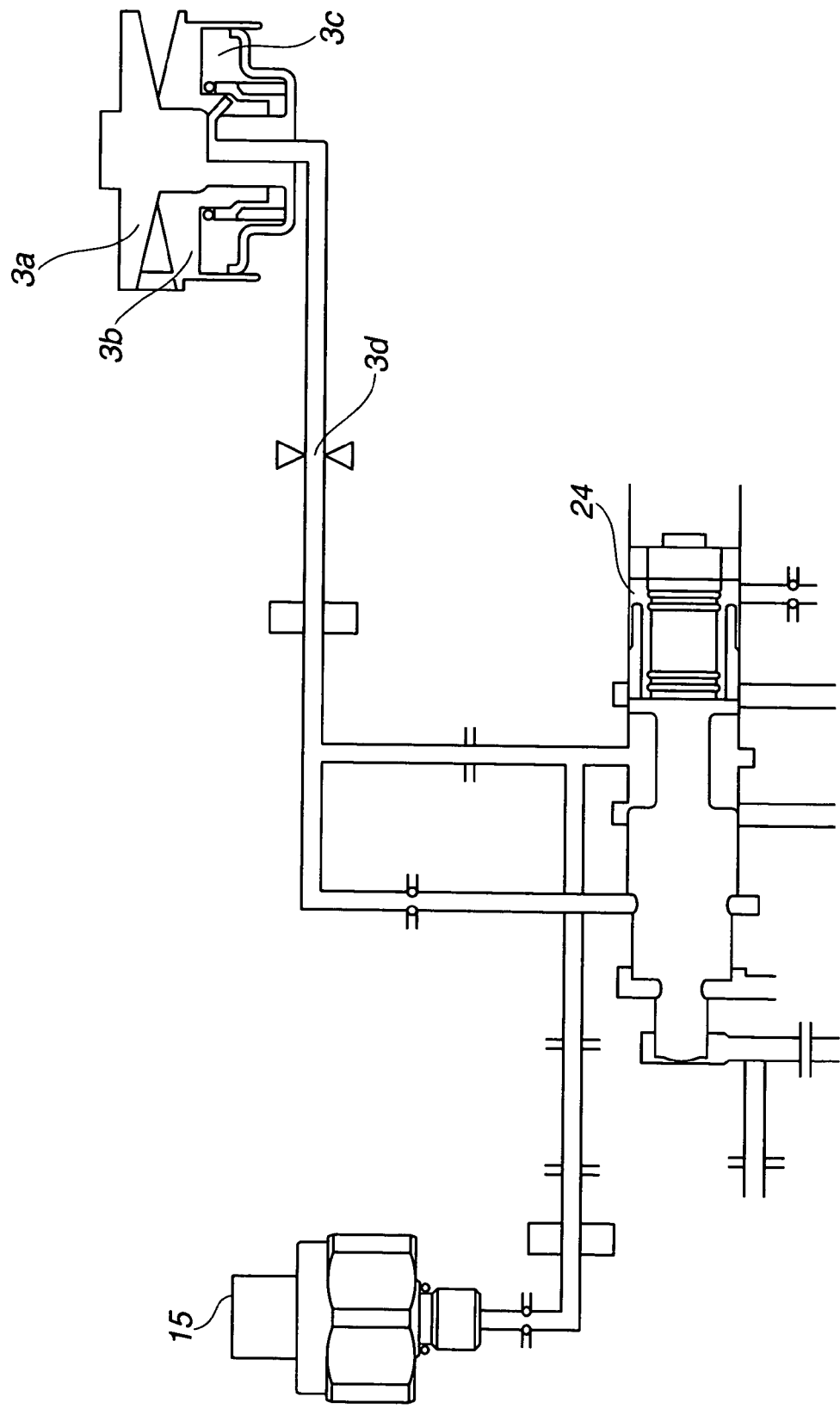
FIG. 4 is a diagrammatic view showing a hydraulic pressure circuit around a secondary pulley of the continuously-variable transmission of FIG. 2.
Figure 5:
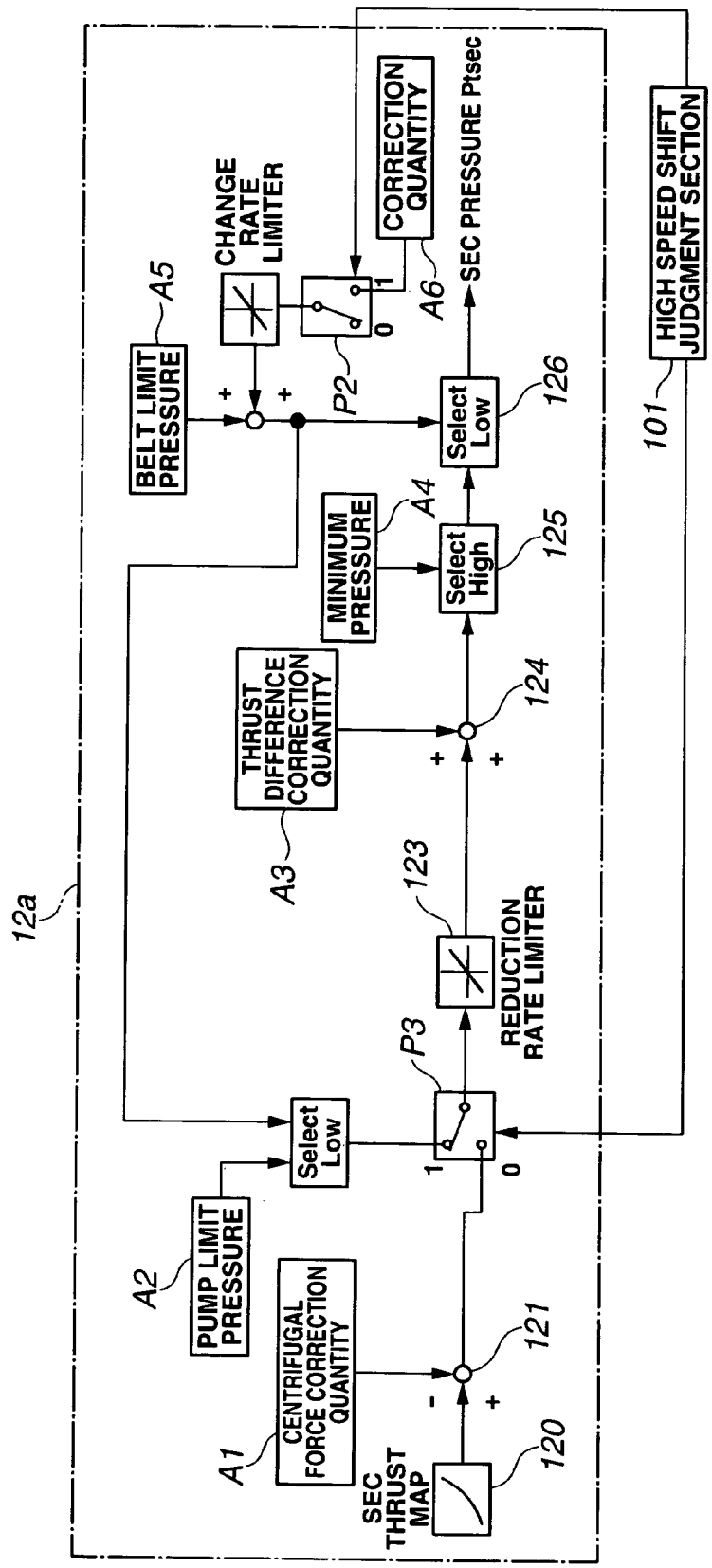
FIG. 5 is a functional block diagram showing a shift control section of the continuously-variable transmission of FIG. 2.
Figure 6:
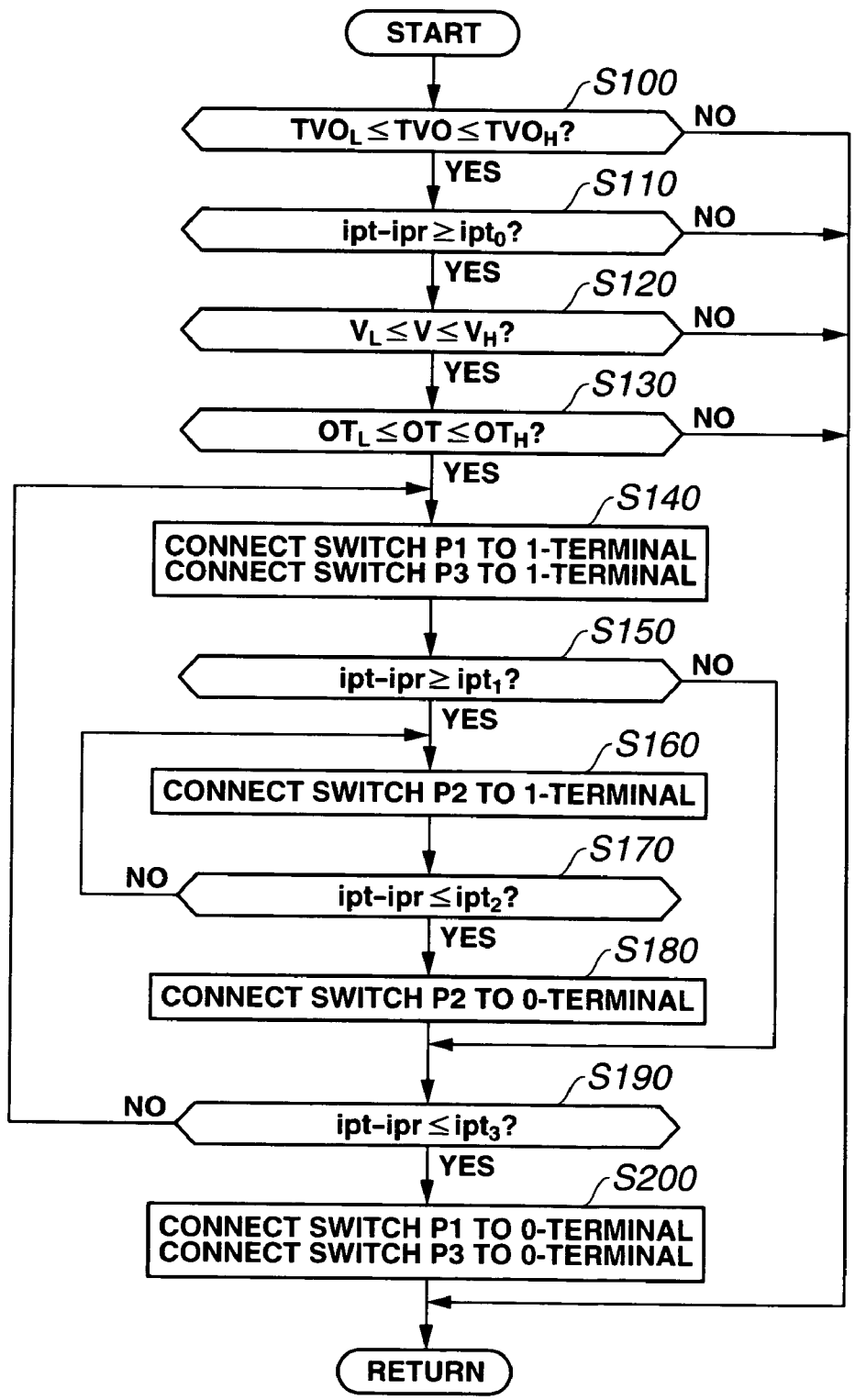
FIG. 6 is a flow chart showing a control process of the continuously-variable transmission of FIG. 2.
Figure 7:
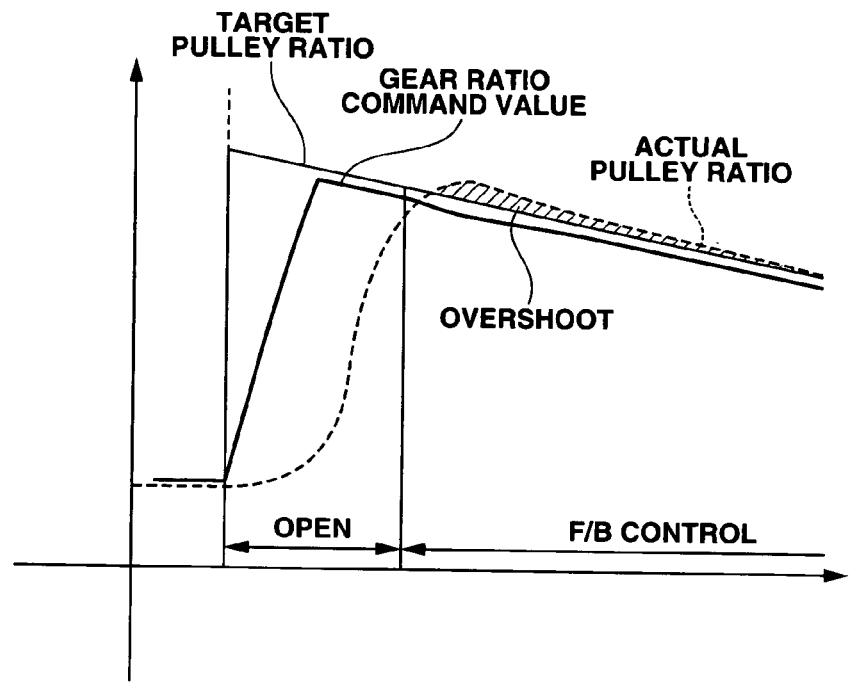
FIG. 7 is a graph showing a time dependent variation between an actual pulley ratio and a transmission gear ratio command value at a shift, in the continuously-variable transmission of FIG. 2.
Figure 8:
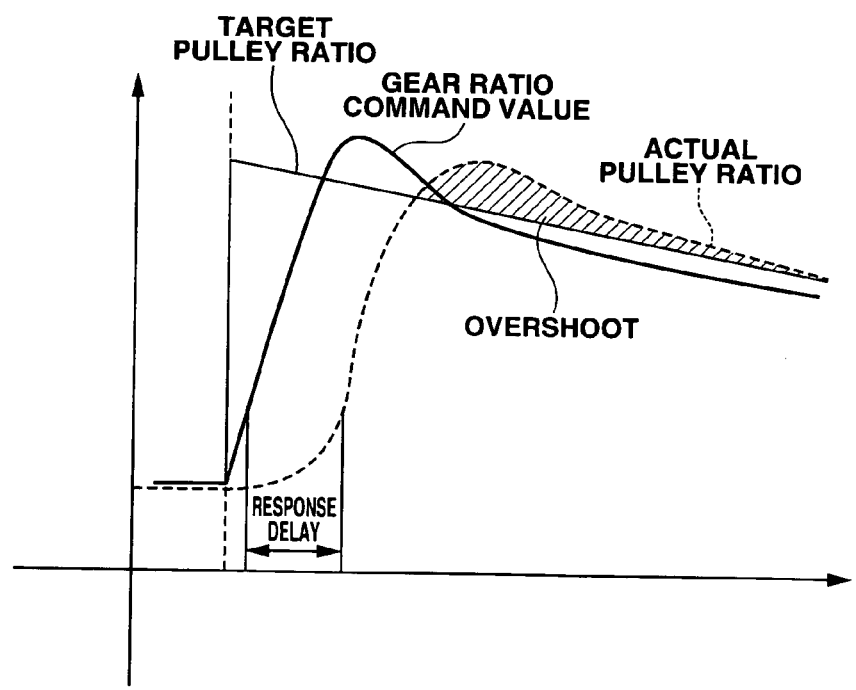
FIG. 8 is a graph showing a time dependent variation between a target pulley ratio and an actual pulley ratio, in a conventional continuously-variable transmission of FIG. 2.

FIGS. 1~7 show views illustrative of a hydraulic pressure control apparatus for a belt-type continuously-variable transmission of a vehicle which is employed as a continuously-variable transmission in an embodiment of the present invention. FIG. 1 is a functional block diagram showing a shift control section of a transmission controller configured to control a step motor. FIG. 2 is a diagrammatic view showing the continuously-variable transmission and a shift control system of the continuously-variable transmission. FIG. 3 is a block diagram showing a configuration of a hydraulic pressure control system of the continuously-variable transmission of FIG. 2. FIG. 4 is a circuit diagram showing a hydraulic circuit around a secondary pulley of the transmission of FIG. 2. FIG. 5 is a view showing a section calculating a target secondary pressure. FIG. 6 is a flow chart showing a control process performing by a control system (a high speed shift judgment section). FIG. 7 is a graph showing a time-dependent variation between a step motor command value and an actual pulley ratio.

As shown in FIG. 2, belt-type continuously variable transmission 1 includes a primary pulley 2 and a secondary pulley 3 each provided with a V-shaped groove, and disposed so that the V-shaped grooves of primary pulley 2 and secondary pulley 3 are aligned with each other, and a V-belt 4 wound around the V-grooves of primary pulley 2 and secondary pulley 3. An engine 5 is disposed in an axis of primary pulley 2. A torque converter 6 and a forward-reverse switching mechanism 7 are disposed between engine 5 and primary pulley 2. Torque converter 6 is disposed between engine 5 and forward-reverse switching mechanism 7. Torque converter 6 is provided with a lockup clutch.

Forward-reverse switching mechanism 7 includes a double pinion planetary gear mechanism having a sun gear connected through torque converter 6 with engine 5, and a career (a planetary career) connected with primary pulley 2. Forward-reverse switching mechanism 7 further includes a forward clutch arranged to directly connect the sun gear and the career of the double pinion planetary gear mechanism, and a reverse brake arranged to fix a ring gear. Forward-reverse switching mechanism 7 is arranged to receive input rotation from engine 5 through torque converter 6, and to directly output this input rotation to primary pulley 2 at the engagement of the forward clutch. Forward-reverse switching mechanism 7 is arranged to receive the input rotation from engine 5 through torque converter 6, to reverse and decelerate the input rotation, and to output this rotation to primary pulley 2 at the engagement of the reverse brake.

Consequently, the rotation to primary pulley 2 is transmitted through V-belt 4 to secondary pulley 3, and then transmitted to wheels (not shown). Primary pulley 2 includes a fixed pulley (fixed sheave) 2a, and a movable pulley (movable sheave) 2b movable in the axial direction, and defining the V-shaped groove of primary pulley 2 with fixed pulley 2a. Secondary pulley 3 includes a fixed pulley (fixed sheave) 3a, and a movable pulley (movable sheave) 3b movable in the axial direction, and defining the V-shaped groove of secondary pulley 3 with fixed pulley 3a. Primary pulley 2 is arranged to vary a groove width of the V-shaped groove of primary pulley 2 by the movement of movable pulley 2b, and to vary a contact radius of V-belt 4 on primary pulley 2. Secondary pulley 3 is arranged to vary a groove width of the V-shaped groove of secondary pulley 3 by the movement of movable pulley 3b, and to vary a contact radius of V-belt 4 on secondary pulley 3. The continuously-variable transmission is arranged to vary a transmission gear ratio (pulley ratio or gear ratio) continuously during power transmission, by varying the contact radiuses of V-belt 4 on primary and secondary pulleys 2 and 3.

A primary chamber 2c of movable pulley 2b of primary pulley 2 is supplied with a primary pressure (or primary thrust) Ppri made from a line pressure serving as a source pressure, so that movable pulley 2b is moved toward fixed pulley 2a. Consequently, primary pulley 2 is frictionally engaged with V-belt 4. A secondary chamber 3c of movable pulley 3b of secondary pulley 3 is supplied with a secondary pressure (or secondary thrust) Psec made from the line pressure serving as the source pressure, so that movable pulley 3b is moved toward fixed pulley 3a. Consequently, secondary pulley 3 is frictionally engaged with V-belt 4. Therefore, the power transmission between primary pulley 2 and secondary pulley 3 is performed by using frictional engagement between the V-belt and each of primary and secondary pulleys 2 and 3.

At a shift, each of V-groove widths of primary and secondary pulleys 2 and 3 is varied by a difference of the thrust between primary pressure Ppri and secondary pressure Psec which are generated in accordance with a target pulley ratio. Accordingly, it is possible to vary the contact radiuses of V-belt 4 on primary and secondary pulleys 2 and 3, and to shift to a desired pulley ratio. To regulate primary pressure Ppri and secondary pressure Psec in this way, there are provided a shift control hydraulic circuit 11 and a transmission controller 12. Shift control hydraulic circuit 11 performs control operations as described later, in response to a signal from transmission controller 12.

Transmission controller 12 receives a signal from a primary pulley rotation sensor 13 arranged to sense a primary pulley rotational speed Npri, a signal from a secondary pulley rotation sensor 14 arranged to sense a secondary pulley rotational speed Nsec, a signal from a hydraulic pressure sensor (a secondary pressure sensor) 15 arranged to sense secondary pressure Psec, and a signal from a hydraulic pressure sensor (a primary pressure sensor) 16 arranged to sense primary pressure Ppri.

(hydraulic system) FIG. 3 shows a configuration of shift control hydraulic circuit 11 and transmission controller 12 as described above.

Shift control hydraulic circuit 11 includes a hydraulic pump 21 driven by engine 5, an oil passage 22 connected with a discharge port of hydraulic pump 21 to transmit (feed) a hydraulic fluid to primary chamber 2c and secondary chamber 3c, a pressure regulating valve 23 arranged to regulate the discharge pressure from hydraulic pump 21 (that is, the hydraulic pressure within oil passage 22), and a pressure reducing valve (a secondary pressure regulating valve) 24 arranged to decrease the hydraulic pressure supplied from oil passage 22 to secondary chamber 3c.

The hydraulic fluid within oil passage 22 is regulated to a predetermined line pressure PL by pressure regulator valve 23. Then, this line pressure PL of oil passage 22 is adjusted by pressure reducing valve 24, and is supplied, as secondary pressure Psec, to secondary chamber 3c. On the other hand, this line pressure PL is regulated by a shift control valve 25, and supplied, as primary pressure Ppri for acting on movable pulley 2b of primary pulley 2, to primary chamber 2c.

Each of pressure regulator valve 23 and pressure reducing valve 24 is a solenoid valve. Pressure regulator valve 23 is arranged to regulate line pressure PL by driving duty to a solenoid 23a. Pressure reducing valve 24 is arranged to regulate secondary pressure Psec by driving duty to a solenoid 24a. As shown in FIG. 4, an orifice 3d is provided between secondary chamber 3c and pressure reducing valve 24. Orifice 3d is arranged to reduce (slow) discharge speed of the hydraulic fluid when the hydraulic fluid is discharged from secondary chamber 3c by pressure reducing valve 24. Therefore, it is possible to prevent sudden decrease of the secondary pressure (the secondary thrust), and to prevent the slippage of the belt.

Shift control valve 25 is arranged to be moved among a neutral position 25a, a pressure-increase position 25b, and a pressure-decrease position 25c. Shift control valve 25 supplies the hydraulic fluid to secondary chamber 3c at pressure-increase position 25b to increase the hydraulic pressure, and drains the hydraulic fluid from secondary chamber 3c at pressure-decrease position 25c to decrease the hydraulic pressure. Shift control valve 25 is connected with an intermediate portion (a central portion) of a shift link (a servo link) 26 to switch a valve position among neutral position 25a, pressure-increase position 25b, and pressure-decrease position 25c. A step motor 27 is connected with one end of shift link 26, and serves as a shift actuator. Movable pulley 2b of primary pulley 2 is connected with the other end of servo link 26. Shift control valve 25, shift link 26, and step motor 27 serve as a mechanical feedback system arranged to automatically adjust the actual pulley ratio to the target pulley ratio.

When step motor 27 is moved a step number STEP corresponding to the target pulley ratio, from a reference position to an operational position, shift link 26 is swung about the connection point between shift link 26 and movable pulley 2b by this movement of step motor 27, and shift control valve 25 is moved from neutral position 25a to pressure-increase position 25b or pressure-decrease position 25c. Accordingly, primary pressure Ppri is increased by line pressure PL serving as the source pressure, or decreased by the discharge of the hydraulic fluid from a drain. Consequently, a pressure difference between primary pressure Ppri and secondary pressure Psec is varied, movable pulley 2b of primary pulley 2 is moved to a position corresponding to the position of step motor 27, and movable pulley 3a of secondary pulley 3 is moved in accordance with the movement of movable pulley 2b of primary pulley 2. Thereby, shift operations such as an upshift to the high pulley ratio and a downshift to the low pulley ratio are performed.

At this shift operation, movable pulley 2b of primary pulley 2 is moved, and the other end of shift link 26 which is connected with movable pulley 2b is swung about (on) the connection point between step motor 27 and shift link 26. When movable pulley 2b of primary pulley 2 is moved to a position (a target pulley ratio position) corresponding to the position of step motor 27, shift link 26 returns shift regulating valve 25 from pressure-increase position 25b or reducing pressure position 25c to neutral position 25a. This mechanical feedback system automatically regulates the hydraulic pressure to adjust the actual pulley ratio to the target pulley ratio.

Transmission controller 12 (the control section) is configured to set the solenoid driving duty of pressure regulator valve 23, the solenoid driving duty of pressure reducing valve 24, and to control the driving of step motor 27. As shown in FIG. 3, transmission controller 12 has a pressure control section 12a and shift control section 12b each of which serves as a functional element. An input side of pressure control section 12a is connected with an input torque sensing section 19, primary pulley rotation sensor 13, secondary pulley rotation sensor 14, and shift control section 12b. Pressure control section 12a receives an input torque information Ti (such as an engine rotational speed and a fuel injection time period), primary pulley rotational speed Npri, secondary pulley rotational speed Nsec, and a shift speed information described later, and calculates (determines) target secondary pressure Ptsec in accordance with input torque information Ti, primary pulley rotational speed Npri, secondary pulley rotational speed Nsec, and the shift speed information. Then, pressure control section 12a controls the solenoid driving duty of pressure regulator valve 23 and the solenoid driving duty of pressure reducing valve 24 in accordance with target secondary pressure Ptsec, so as to regulate secondary pressure Psec supplied to secondary chamber 3c.

Shift control section 12b is connected with primary rotational speed sensor 13, secondary rotational speed sensor 14, a throttle opening sensor 17, a vehicle speed sensor 30, and a hydraulic fluid temperature sensor 31, and receives primary pulley rotational speed Npri and secondary pulley rotational speed Nsec. Shift control section 12b sets target pulley ratio IPt in accordance with primary pulley rotational speed Npri and secondary pulley rotational speed Nsec, to set driving step number STEP of step motor 27.

(control for the step motor) Hereinafter, the driving step number control operation of step motor 27 which is performed by shift control section 12b will be illustrated. FIG. 1 is a block diagram for illustrating the control operation of step motor 27 which is performed by shift control section 12b. As shown in FIG. 1, shift control section 12b includes a target pulley ratio setting section 100, a high speed shift judgment section (judgment section) 101, an actual pulley ratio calculating section (actual pulley ratio sensing section) 102, a control section 103, and a command value conversion section 111 which serve as functional elements. Shift control section 12b receives a vehicle speed V, a throttle opening TVO, primary pulley rotational speed Npri, and secondary pulley rotational speed Nsec, and determines a target transmission gear ratio command value, in accordance with vehicle speed V, throttle opening TVO, primary pulley rotational speed Npri, and secondary pulley rotational speed Nsec. Shift control section 12b outputs a driving step number command signal corresponding to the target transmission gear ratio command value, to a motor driver 27a configured to control step motor 27.

Target pulley ratio setting section 100 receives throttle opening TVO and vehicle speed V, and sets target pulley ratio IPt in accordance with throttle opening TVO and vehicle speed V, by a shift diagram based on throttle opening TVO and vehicle speed V. High speed shift judgment section 101 receives vehicle speed V, an oil temperature OT, actual pulley ratio IPr, and target pulley ratio IPt. High speed shift judgment section 101 judges whether there is a request for a high speed shift (high speed movement) or not, in accordance with vehicle speed V, oil temperature OT, actual pulley ratio IPr, and target pulley ratio IPt. High speed shift judgment section 101 selects, as a shift speed at the shift operation, a normal shift speed (a first speed) or a high shift speed (a second speed) faster than the normal shift speed. When high speed shift judgment section 101 selects the shift at the first speed (a normal shift mode), high speed shift judgment section 101 controls switch P1 serving as a movement switching section provided in control section 103, to be connected with a 0 terminal. When high speed shift judgment section 101 selects the shift at the second speed (a high speed shift mode), high speed shift judgment section 101 controls switch P1 to be connected with a 1 terminal. Moreover, high speed shift judgment section 101 is configured to output a control signal to pressure control section 12a, and to control switching of switch P2 and switch P3 provided in pressure control section 12a as described later. Judgment (Control) conditions in high speed shift judgment section 101 and control conditions of the switching of each of switches P1~P3 will be illustrated later.

Command value conversion section 111 has a map based on the transmission gear ratio and the position of step motor 27. Command value conversion section 111 is configured to convert the transmission gear ratio command value outputted from control section 103, to the driving step number command signal of step motor 27. Control section 103 includes two control circuits of a high speed shift control section 103a and a normal control section 103b, and a switch P1 arranged to switch the output of high speed shift control section 103a and the output of normal control section 103b. An output side of high speed shift control section 103a is connected with the 1 terminal of switch P1. An output side of normal section 103b is connected with the 0 terminal of switch P1. That is, when high speed shift judgment section 101 selects the normal shift mode, control section 103 outputs an output value of normal control section 103b. When high speed shift judgment section 101 selects the high speed shift mode, control section 103 outputs an output value of high speed shift control section 103a.

Normal control section 103b includes a time constant setting section 104, a following (tracking) compensating section (compensator) 105, a gain calculating section 106, a first filter 107, a delay circuit 108, and a second filter 109. Normal control section 103b is a feedback circuit using the transmission gear ratio command value (that is, the driving command value of step motor 27) and actual pulley ratio IPr inputted from actual pulley ratio calculating section 102. Normal control section 103b calculates the driving command value of step motor 27 at an every predetermined calculating cycle.

In normal control section 103b, first, time constant setting section 104 sets a time constant T relating to the shift speed. Following compensation section 105 receives time constant T and target pulley ratio IPt. Time constant T is set based on a map of throttle opening TVO and vehicle speed V, and difference between target pulley ratio IPt and actual pulley ratio IPr (that is, a shift width). This time constant map is stored at each of shift operations such as the upshift, the downshift, and the depression-induced downshift (a downshift accompanying the driver's depression).

Following compensation section 105 delays target pulley ratio IPt in accordance with time constant T by the first-order delay, based on target pulley ratio IPr and time constant T, and calculates or computes a transient target pulley ratio IPtm. That is, transient target pulley ratio IPtm is set to increase linearly with the time, in consideration with the delay of the response of the actual pulley ratio with respect to the transmission gear ratio command value. Besides, the difference between target pulley ratio IPt and transient target pulley ratio IPtm which is divided by time constant T is a target shift speed (IPt−Iptm)/T.

Actual pulley ratio calculation section 102 outputs a signal of actual pulley ratio IPr to gain calculation section 106 and first filter 107. Gain calculation section 106 outputs an F/B correction value which a predetermined gain is added to actual pulley ratio IPr. Transient target transmission gear ratio IPtm outputted from following compensator 105 is modified by subtracting the F/B correction value.

Each of first filter 107 and second filter 109 is a first-order delay filter, and has a predetermined filter coefficient. That is, first filter 107 decreases a minute (minimal) variation (noise) of the inputted signal of actual pulley ratio IPr. First filter 107 decreases fluctuation range (variation range) in a case in which actual pulley ratio IPr is suddenly varied, and outputs a signal value (an actual pulley ratio filter value) of this actual pulley ratio IPr with the decreased variation width (fluctuation range). Second filter 109 decreases noise and sudden variation of the transmission gear ratio command value calculated at the prior calculation circle, and outputs a signal value (a transmission gear ratio command filter value) of this transmission gear ratio with the decreased fluctuation range.

Delay circuit 108 is a circuit in which an output signal is delayed by a predetermined time period (a predetermined calculation periodic number) with respect to an input signal. Delay circuit 108 outputs a signal value inputted before a predetermined calculation periodic number. The transient target transmission gear ratio is modified by subtracting a difference between the output value from first filter 107 and the output value from delay circuit 108, and outputted as the transmission gear ratio command value. Moreover, the difference between the output value from first filter 107 and the output value from delay circuit 108 is inputted to a steady-state error section 110 of high speed shift control section 103a described later, as a correction quantity for modifying a steady-state error in high speed shift control section 103a.

In this way, normal control section 103b performs a feedback control so that actual pulley ratio IPr reaches target pulley ratio IPt at a shift time period (the shift speed) set by time constant T. Next, high speed shift control section 103a will be illustrated. High speed shift control section 103a includes steady-state error correction section 110 configured to output a correction quantity signal to a steady-state error of actual pulley ratio IPr with respect to the transmission gear ratio command value. This correction quantity is inputted from normal control section 103b immediately before the switching to the high speed control operation.

High speed shift control section 103a does not perform the feedback control operation with respect to the inputted target pulley ratio IPr, and performs open-loop control operation. That is, the signal value of target pulley ratio IPr which is inputted from target pulley ratio setting section 100 is modified by the output value from steady-state error correction section 110, and directly inputted to motor driver 27a. Motor driver 27a drives (moves) step motor 27 to a position corresponding to the inputted target pulley ratio IPt.

(control for the secondary pressure) Hereinafter, control for the secondary pressure which is performed in pressure control section 12a will be illustrated. FIG. 5 is a block diagram for illustrating control to determine target secondary pressure Ptsec in pressure control section 12a. As shown in FIG. 5, pressure control section 12a includes a target secondary pressure setting section 12c serving as a functional component. Target secondary pressure setting section 12c includes a base secondary pressure setting section 120, a centrifugal thrust correction section 121, a reduction rate limiter 123, a thrust difference correction section 124, a first comparison section 125, and a second comparison section 126. Target secondary pressure setting section 12c calculates (determines) target secondary pressure Ptsec by using parameters A1~A6 as described below.

Pressure control section 12a includes a switch P2 and a switch P3 each configured to perform the switching in response to a control signal from high speed shift judgment section 101 of shift control section 12b. Parameter A1 (a centrifugal force correction quantity A1) is a correction quantity which corresponds to a centrifugal force, and which corresponds to a centrifugal thrust generated by the centrifugal force of secondary pulley 3. Centrifugal force correction quantity A1 is set in accordance with secondary rotational speed Nsec.

Parameter A2 (a pump limit pressure A2) is a limit of pressure supply of hydraulic pump 21 which varies in accordance with the output of engine 5. Parameter 3 (a thrust difference correction quantity A3) is a correction quantity for providing the difference of the thrust which is necessary for performing the shift at the shift speed set by the map corresponding to target pulley ratio IPt, the actual pulley ratio and the shift speed.

Parameter A4 (a lowest pressure or minimum pressure A4) is a mechanical minimum limit pressure to judge whether the inputted value is equal to or greater than the minimum limit pressure capable of generating in a mechanically stable state. That is, in a case in which the secondary pressure necessary for transmitting the torque is smaller than the mechanical minimum limit pressure, the secondary pressure command value is set to minimum pressure A4 as the minimum limit of the secondary pressure command value. Parameter A5 (a belt limit pressure A5) is a secondary pressure corresponding to a limit of strength of V-belt 4. In a case in which the secondary pressure Psec exceeds this belt limit pressure A5, damage such as a rupture of V-belt 4 may be incurred.

Parameter A6 (a belt limit pressure excess correction quantity A6) is a correction quantity which is added to belt limit pressure A5 when high speed shift judgment section 101 controls switch P2 to be connected with the 1 terminal in a case in which a predetermined condition as described later is satisfied (an excess hydraulic pressure mode). A change rate limiter is configured to gradually increase or gradually decrease belt limit pressure excess correction quantity A6 which is added to belt limit pressure A5 (target secondary pressure Ptsec) for the correction. Accordingly, when the connection of switch P3 is switched, it is possible to prevent sudden disappearance of belt limit pressure excess correction quantity A6 which is added to belt limit pressure A5, and to prevent sudden addition of belt limit pressure excess correction quantity A6 to belt limit pressure A5. Therefore, it is possible to prevent the sudden variation of target secondary pressure Ptsec.

First, the control operation in the normal shift mode will be illustrated. In the normal shift mode, high speed shift judgment section 101 controls switch P2 to be connected with the 0 terminal, and controls switch P3 to be connected with the 0 terminal. In pressure control section 12a, first, base secondary pressure setting section 120 sets a base secondary pressure (a base secondary thrust) from the map based on the inputted torque information Ti.

Then, centrifugal thrust correction section 121 modifies the base secondary pressure determined in base secondary pressure setting section 120, by subtracting centrifugal force correction quantity A1. That is, base secondary pressure setting section 120 and centrifugal thrust correction section 121 calculate secondary pressure Psec for obtaining a minimum thrust necessary for the torque transmission without incurring the slippage of the belt.

Next, correction by reduction rate limiter 123 is performed. Reduction rate limiter 123 stores target secondary pressure Ptsec which is calculated immediately before. Reduction rate limiter 123 is configured to limit a reduction rate or a decreasing amplitude (range) to a reference value when the inputted value is extremely small with respect to the stored target secondary pressure Ptsec (that is, when the reduction rate or the decreasing amplitude is equal to or greater than a reference value). In a case in which the high value of secondary pressure Psec at the downshift is immediately decreased to the extreme low value of secondary pressure Psec at the upshift, the belt slippage tends to occur for the extreme decrease of secondary pressure Psec. However, reduction rate limiter 123 is arranged to limit the reduction rate or the decreasing amplitude to the reference value when the reduction rate or the decreasing range is equal to or greater than the reference value, and accordingly it is possible to suppress the sudden decrease of secondary pressure Psec, and thereby to prevent the belt slippage by the gentle variation in secondary pressure Psec.

Thrust difference correction section 124 modifies target secondary pressure Psec (the signal value from reduction rate limiter 123) by adding thrust difference correction quantity A3 so as to add the secondary pressure necessary for generating the difference of the thrust necessary for performing the shift at the desired shift speed. First comparison section 125 is configured to compare minimum pressure A4 and the value calculated by thrust difference correction section 124, and to output the greater one of these two values. Thereby, it is possible to prevent the secondary pressure command value from becoming smaller than minimum pressure A4 which is the mechanical minimum limit.

Second comparison section 126 is configured to compare belt limit pressure A5 and the signal value determined in first comparison section 125, and outputs, as target secondary pressure Ptsec, the smaller one of belt limit pressure A5 and the value calculated in first comparison section 125. Thereby, it is possible to prevent target secondary pressure Ptsec from becoming greater than the belt limitation secondary pressure. Next, the control operation in the high speed shift mode will be illustrated. In the high speed control mode, switch P2 is connected with the 0 terminal, and switch P3 is connected with the 1 terminal.

In the high speed shift mode, switch P3 is connected with the 1 terminal, and the control operations in base secondary pressure setting section 120 and centrifugal thrust correction section 121 as described above are not performed. The smaller one of pump limit pressure A2 and belt limit pressure A5 is inputted to reduction rate limiter 123. Besides, high speed shift judgment section 101 does not select the high speed shift mode in a case in which the engine output is not a predetermined high output, as described later. Since the engine is in the high output state when the shift mode is in the high speed shift mode, pump limit pressure A2 usually becomes greater than belt limit pressure A5. Consequently, belt limit pressure A5 is inputted to reduction rate limiter 123.

Then, reduction rate limiter 123, thrust difference correction section 124, first comparison section 125, and second comparison section 126 perform the above mentioned control operations. Consequently, second comparison section 126 always outputs belt limit pressure A5. In this way, in the high speed control mode, target secondary pressure Ptsec is set to the mechanical limit value (belt limit pressure A5), to provide the difference of the thrust for performing the shift (the downshift) at the high shift speed.

Next, a control operation in the excess hydraulic pressure mode will be illustrated. In the excess hydraulic pressure mode, high speed shift judgment section 101 controls switch P2 to be connected with the 1 terminal, and controls switch P3 to be connected with the 1 terminal. In the excess hydraulic pressure mode, switch P2 is connected with the 1 terminal, and reduction rate limiter 123 receives the lower one of pump limit pressure A2 and sum (an excess hydraulic pressure) of belt limit pressure A5 and belt limit pressure excess correction quantity A6. Since in the excess hydraulic pressure mode the engine is in the high output state, pump limit pressure A2 is usually greater than the excess hydraulic pressure. Accordingly, the excess hydraulic pressure is inputted to reduction rate limiter 123.

Then, reduction rate limiter 123, thrust difference correction section 124, first comparison section 125, and second comparison section 126 perform the above-mentioned control operations. Accordingly, second comparison section 126 always outputs the excess hydraulic pressure. In this way, in the excess hydraulic pressure mode, target secondary pressure Ptsec is set to the excess hydraulic pressure which is the sum of the mechanical limit value (belt limit pressure A5) and belt limit pressure excess correction quantity A6, to provide the difference of the thrust for performing the shift (the downshift) at the high shift speed. In the excess hydraulic pressure mode, target secondary pressure Ptsec is set to the excess hydraulic pressure greater than belt limit pressure A5, and however the actual secondary pressure Psec does not reach the belt limit secondary pressure as described later. Accordingly, the damage such as the rupture of the V belt does not occur.

(judgment conditions of high speed shift judgment section)
Next, the judgment at high speed shift judgment section 101 and a switch start condition of each of switches P1~P3 shown in FIGS. 1 and 5 will be illustrated. FIG. 6 is a flow chart showing a control process performed by high speed shift judgment section 101. As shown in FIG. 6, high speed shift judgment section 101 selects the high speed shift mode when the conditions of step S100~step S130 are satisfied, and the shift at the second speed is performed.

A first condition shown in step S100 is a condition of the engine output (engine load state). At step S100, high speed shift judgment section 101 judges whether throttle opening TVO is within a predetermined region of $TVO_L \leq TVO \leq TVO_H$ or not. When the answer of step S100 is affirmative (YES), the process proceeds to step S110. When the answer of step S100 is negative (NO), the process proceeds to the return. In this condition, when throttle opening TVO is smaller than the reference level $TVO_L$, it is possible to judge that the engine is a low load state, and that there is no acceleration request. On the other hand, when throttle opening TVO is extremely large, the significant downshift is not performed.

A second condition shown in step S110 is a condition of the downshift that deviation (error) $\Delta IP$ between the inputted target pulley ratio IPr and actual pulley ratio IPr (=IPt−IPr, $\Delta IP>0$) is equal to or greater than a predetermined shift width $ipt_0$. When deviation $\Delta IP$ is equal to or greater than the predetermined shift width $ipt_0$, the process proceeds to step S120. When the deviation $\Delta IP$ is not equal to or greater than the predetermined shift width $ipt_0$, the process returns to the return. In a case in which the driver requests the sudden acceleration, the accelerator pedal is depressed, and target pulley ratio IPt is immediately increased to the downshift side, so that deviation ΔIP between target pulley ratio IPt and actual pulley ratio IPr is increased. Accordingly, it is possible to judge that there is necessary to perform the depression-induced downshift control that the driver requests the sudden acceleration when deviation ΔIP is equal to or greater than the predetermined shift width $ipt_0$. Besides, in a case in which the shift width is small, the high shift speed is not requested, and switch P1 is set to the 0 position. Normal control section 103b performs the shift operation at the first speed.

A third condition at step S120 is a condition that vehicle speed V is in a predetermined range ($V_L \leq V \leq V_H$). When the vehicle speed V is in the predetermined range of $V_L \leq V \leq V_H$, the process proceeds to step S130. When vehicle speed V is not in the predetermined range of $V_L \leq V \leq V_H$, the process proceeds to the return. In each of pulleys 2 and 3, when the shift speed per the pulley rotational speed (that is, corresponding to a stroke amount of the movable pulley 2b per one rotation of the pulley) is increased, and the belt slippage tends to occur. Accordingly, it is necessary to increase the thrust applied to each of the pulleys 2 and 3, to the vicinity of the upper limit. In this state, even if the control operation of the high speed shift mode is performed, it is not possible to attain the practical effect, and further the belt slippage may be incurred. Accordingly, at the low vehicle speed that vehicle speed V is lower than the predetermined vehicle speed (the reference vehicle speed) $V_L$, the control operation of the high speed shift mode is not performed. On the other hand, at the high vehicle speed that vehicle speed V is greater than the predetermined vehicle speed $V_H$, there is no need that the shift speed is set to the high speed, and accordingly the high speed mode is not selected.

A fourth condition at step S130 is a condition that temperature OT of the hydraulic fluid supplied to the hydraulic system is in a predetermined range of $OT_L \leq OT \leq OT_H$. When temperature OT of the hydraulic fluid is in the predetermined range of $OT_L \leq OT \leq OT_H$, the process proceeds to step S140. When temperature OT of the hydraulic fluid is not in the predetermined range of $OT_L \leq OT \leq OT_H$, the process proceeds to the return. In the case of the high temperature of the hydraulic fluid, the discharge quantity from the pump is decreased, and the belt slippage may be incurred for the deficiency of the hydraulic pressure supplied to each of pulleys 2 and 3. In the case of the low temperature of the hydraulic fluid, responsiveness of the hydraulic fluid is poor, and the belt slippage may be incurred in the case of the deficiency of the hydraulic pressure supplied to each of pulleys 2 and 3.

When the conditions of step S100~step S130 are satisfied, at step S140, high speed shift judgment section 101 controls switch P1 to be connected with the 1 terminal, and controls switch P3 to be connected with the 1 terminal. That is, high speed shift judgment section 101 judges that there is the high speed shift request, and selects the high speed shift mode. High speed shift control section 103a of control section 103 starts to control the transmission gear ratio command value (that is, the driving step number command signal of step motor 27) by the open-loop control based on target pulley ratio IPr. Moreover, pressure control section 12a sets target secondary pressure Ptsec to belt limit pressure A5, and produces the thrust necessary for the shift at the high speed.

In a case in which the high shift speed mode is selected at step S140, step S150 judges whether deviation ΔIP is equal to or greater than a predetermined shift width $ipt_1$ or not. This shift width $ipt_1$ is set to a value greater than shift width $ipt_0$ at step S110. When deviation ΔIP is equal to or greater than the predetermined shift width $ipt_1$, the process proceeds to step S160. At step S160, high speed shift judgment section 101 controls switch P2 to be connected with the 1 terminal. That is, high speed shift judgment section 101 selects the excess hydraulic pressure mode, and sets target secondary pressure Ptsec to the excess hydraulic pressure.

In the excess hydraulic pressure mode, target secondary pressure Ptsec is set to the value greater than the belt limit pressure as mentioned above, and this reason will be illustrated below. As mentioned above, orifice 3d is provided in the oil passage in the vicinity of secondary chamber 3c. Accordingly, it is possible to prevent the sudden decrease in the secondary pressure when target secondary pressure Ptsec is immediately set to a small value in a case in which the transmission gear ratio is changed to the high side. Consequently, it is possible to prevent the actual secondary pressure from decreasing than target secondary pressure Ptsec, and thereby to prevent the belt slippage.

As mentioned above, orifice 3d is provided between secondary chamber 3c and pressure reducing valve 24 as shown in FIG. 4. In a case of increasing the secondary pressure, the pressure between pressure reducing valve 24 and orifice 3d is rapidly increased, and meanwhile the pressure between secondary chamber 3c and orifice 3d is slackly (slowly) increased. Consequently, the pressure between secondary chamber 3c and orifice 3d is in the low pressure state, even when the pressure between pressure reducing valve 24 and orifice 3d is in the high pressure state. However, hydraulic pressure sensor for sensing this secondary pressure is provided between orifice 3d and pressure reducing valve 24 for the space limitations, and the output value of hydraulic pressure sensor 15 shows a value greater than the actual pressure of secondary chamber 3c. Accordingly, in a case in which the feedback control of the secondary pressure is performed in accordance with the sensed value of hydraulic pressure sensor 15, it is judged that the secondary pressure reaches the target value by judging the sensed value, even when the actual secondary pressure is low. Consequently, the control shifted to the low pressure side is performed.

Accordingly, when a deviation (a secondary pressure deviation) between the sensed value and the actual value of the secondary pressure is equal to or greater than a reference in a case in which the secondary pressure is rapidly increased, target secondary pressure Ptsec is modified by adding the predetermined quantity A6 corresponding to this deviation. Since target secondary pressure Ptsec is set to the belt limit pressure, target secondary pressure Ptsec which is modified by adding the predetermined quantity A6 exceeds the belt limit pressure. Even when target secondary pressure Ptsec is set greater than the predetermined belt limit pressure, belt limit pressure excess correction quantity A6 is set to the appropriate value, and actual secondary pressure Psec does not exceed the belt limit pressure. Moreover, it is possible to rapidly increase actual secondary pressure Psec, and to achieve the rapid shift down.

Step S150 judges whether deviation ΔIP is equal to or greater than the predetermined shift width $ipt_1$, or not. That is, step S150 judges whether the secondary pressure deviation becomes large (a large value larger than a reference value determined, in advance, by an experiment and so on) or not. When deviation ΔIP becomes equal to or greater than the predetermined shift width $ipt_1$, step S150 judges that the secondary pressure deviation is large. At step S160, the control operation of the excess hydraulic pressure mode is performed. When deviation ΔIP is smaller than shift width, it is judged that the secondary pressure deviation is not large, and the excess hydraulic pressure mode is not selected.

In a case in which the control operation of the excess hydraulic pressure mode is performed at step S160, step S170 judges whether deviation ΔIP between target pulley ratio IPt and actual pulley ratio IPr is equal to or smaller than the predetermined shift width $ipt_2$. The predetermined shift width $ipt_2$ is a threshold value for judging that the difference between target pulley ratio IPt and actual pulley ratio IPr is small, and that the shift is shortly terminated. Shift width $ipt_2$ is set to a minute value smaller than shift widths $ipt_0$ and $ipt_1$.

When the difference between target pulley ratio IPt and actual pulley ratio IPr is greater than the predetermined shift width $ipt_2$, the process returns to step S160. The excess hydraulic pressure mode is continued until the difference between target pulley ratio IPr and actual pulley ratio IPr becomes equal to or smaller than the predetermined shift width $ipt_2$. When the difference between target pulley ratio IPt and actual pulley ratio IPr becomes equal to or smaller than shift width $ipt_2$, the process proceeds to step S180. High speed shift judgment section 101 controls switch P2 to be connected with the 0 terminal, and terminates the excess hydraulic pressure mode.

As mentioned above, in this state, when switch P2 is connected with the 0 terminal in FIG. 5, the input of belt limit pressure excess correction quantity A6 added to belt limit pressure A5 is interrupted. The change rate limiter gradually decreases the correction quantity which is added to belt limit pressure A5. At step S190, deviation ΔIP and a predetermined shift width $ipt_3$ serving as the predetermined reference value are compared in a magnitude relation. When deviation ΔIP is greater than the predetermined shift width $ipt_3$, the process returns to step S140. The high speed shift mode is continued until deviation ΔIP becomes equal to or smaller than the predetermined shift width $ipt_3$. When deviation ΔIP becomes equal to or smaller than the predetermined shift width $ipt_3$, the process proceeds to step 5200. High speed shift judgment section 101 controls switch P1 to be connected with the 0 terminal, controls switch P2 to be connected with the 0 terminal, and terminates the high speed shift mode. Shift width $ipt_3$ is set smaller than shift width $ipt_2$ because the change rate limiter gradually decreases the correction quantity which is added to belt limit pressure A5, even though the excess hydraulic pressure mode is terminated at step S180.

In the control apparatus for the continuously-variable automatic transmission according to the present invention, normal control section 103b performs the feedback control for the transmission gear ratio command value (the driving step number command signal of step motor 27) based on target pulley ratio IPt, at the normal shift. Thereby, it is possible to surely adjust actual pulley ratio IPr to target pulley ratio IPt. In this feedback control operation, following compensation section 105 linearly increases the transmission gear ratio command value in accordance with time constant T corresponding to the shift speed (the first speed), in consideration with the variation characteristic in which actual pulley ratio IPr is linearly varied with respect to the transmission gear ratio command value. Accordingly, it is possible to rapidly adjust actual pulley ratio IPr to target pulley ratio IPt, and to decrease the deviation between the transmission gear ratio command value and the actual pulley ratio IPr at the shift operation. Therefore, it is possible to decrease overshoot of actual pulley ratio IPr by the integral control.

Moreover, in a case of requesting a high responsiveness of the shift at the depression-induced downshift at the high-speed running, high speed shift judgment section 101 selects the high speed shift mode, and performs the shift at the shift speed larger than the shift speed in the normal condition. In this high speed shift mode, high speed shift control section 103a performs the open-loop control of the transmission gear ratio command value based on target pulley ratio IPt. Thereby, it is possible to suppress the overshoot of the transmission gear ratio which is incurred by the integral control when the feedback control is performed, since the variation characteristic of actual pulley ratio IPr with respect to the transmission command value is not the linear variation at the high shift speed (see FIG. 7). In this open-loop control, steady-state error correction section 110 modifies the steady-state error of the correction value by the steady-state error correction quantity inputted immediately before switching from the normal shift mode to the high speed shift mode. Accordingly, it is possible to surely shift the actual pulley ratio to target pulley ratio IPt.

Moreover, at the high speed shift mode, target secondary pressure Ptsec is set to belt limit pressure A5. In this state, when deviation ΔIP becomes equal to or greater than the predetermined shift width $ipt_1$, target secondary pressure Ptsec is set to the sum of belt limit pressure A5 and belt limit pressure excess correction quantity A6. Accordingly, it is possible to keep actual secondary pressure Psec to the vicinity of the belt limit pressure, even when the orifice suppresses the increasing of actual secondary pressure Psec at the shift operation at the high speed. Thereby, it is possible to keep the difference of the thrust necessary for performing the shift operation at the high speed. Moreover, actual primary pressure Ppri is increased when actual secondary pressure Psec is increased (in the high pressure state), and it is possible to prevent the slippage of the belt of primary pulley 2 at the shift operation performed at the high speed.

In the high speed shift mode, when deviation ΔIP is equal to or greater than the predetermined shift width $ipt_1$ and the actual shift speed is large, target secondary pressure Ptsec is set to the excess hydraulic pressure of the sum of belt limit pressure A5 and belt limit pressure excess correction quantity A6. Accordingly, it is possible to hold the hydraulic pressure within secondary chamber 3c to the vicinity of the belt limit pressure, even when the detection error of the sensed actual secondary pressure Psec with respect to the actual secondary pressure is incurred. Accordingly, it is possible to provide the difference of the thrust necessary for performing the high speed shift, and to prevent the decrease in the secondary pressure for the detection error. Therefore, it is possible to decrease primary pressure Ppri with secondary pressure Psec, and to surely decrease the belt slippage.

In the control apparatus according to the present invention, when the controller judges that there is the high speed shift request, target secondary pressure Ptsec is set to the belt limit pressure or the excess hydraulic pressure greater than the belt limit pressure. The setting of secondary pressure Ptsec is not limited to this manner. For example, time constant T adjusted in accordance with a desired shift speed is set to perform the shift at the second speed, and target secondary pressure Ptsec is set by the conventional manner.

Moreover, the judgment (control) conditions at high speed shift judgment section 101 are not limited to the above described conditions. In the control apparatus according to the embodiments, when the conditions of step S100~step S130 as shown in FIG. 6 are satisfied, the controller judges that there is the high speed operation request. However, for example, the only condition of deviation ΔIP of step S110 may be employed. Moreover, it is optional to employ, as the engine load condition of step S100, a condition that accelerator pedal opening (APO) is in a predetermined region, instead of throttle opening TVO. Furthermore, it is optional to switch to the normal shift mode by time-out measured by a timer in a case in which the high speed shift mode continues during a predetermined time period, for surely preventing the belt slippage, in addition to the conditions of step S100~step S130.

In the control apparatus according to the embodiment of the present invention, the conditions of the start of the excess hydraulic pressure mode are the condition that the high speed shift mode is selected to adjust the shift speed to the high speed, and the condition deviation $\Delta$IP is equal to or greater than the predetermined shift width $ipt_1$. Additionally, it is optional to add a condition that the actual shift speed is equal to or greater than a predetermined speed. In this case, it is optional to omit the condition that deviation $\Delta$IP is equal to or greater than the predetermined shift width $ipt_1$. Thereby, only when the actual shift speed is equal to or greater than the predetermined speed and the pressure difference between the both sides of orifice $3d$ is equal to or greater than a constant value, the excess hydraulic pressure mode is selected. Accordingly, it is possible to keep the pressure within secondary chamber $3c$ to the vicinity of the belt limit pressure without exceeding belt limit pressure A5. Therefore, it is possible to prevent the damage of the belt by the excessive secondary pressure Psec, and to surely prevent the belt slippage by the decrease in secondary pressure Psec.

In the control apparatus according to the embodiment of the present invention, when the controller judges that there is the high speed shift request, target secondary pressure Ptsec is set to the belt limit pressure or the excess hydraulic pressure larger than the belt limit pressure. The setting of target secondary pressure Ptsec is not limited to the above-mentioned manner. For example, time constant T adjusted in accordance with the desired shift speed is set to perform the shift at the second speed, and target secondary pressure Ptsec is set by the conventional manner. Then, in this state, when the above-mentioned condition (the excess hydraulic pressure mode start condition) is satisfied, it is optional to further modify target secondary pressure Ptsec set by the conventional manner, by adding the predetermined correction quantity. Thereby, it is possible to prevent the adverse effect of the suppression of the pressure increase at the high speed shift which is incurred by the orifice, and to prevent the actual pressure within secondary chamber $3c$ from extremely decreasing with respect to the set target secondary pressure Ptsec.

Moreover, the judgment conditions at high speed shift judgment section 101 are not limited to the conditions of the control apparatus according to the embodiments. In the control apparatus according to the embodiments, when the conditions of step S100~step S130 as shown in FIG. 6 are satisfied, the controller judges that there is the high speed operation request. Moreover, it is optional to add a condition that primary pulley rotational speed Npri is within the predetermined range to surely prevent the belt slippage, in addition to the conditions of step S100~step S130. Moreover, it is optional to switch to the normal shift mode by time-out measured by a timer in a case in which the high speed shift mode continues during a predetermined time period, for surely preventing the belt slippage, in addition to the conditions of step S100~step S130.

The control apparatus for the automatic transmission includes a primary pulley including a movable pulley, the primary pulley being connected with an input, a secondary pulley including a movable pulley, the secondary pulley being connected with an output, a belt wound around the primary pulley and the secondary pulley, a shift control valve configured to regulate a hydraulic pressure acting on the movable pulley of the primary pulley, a step motor configured to be moved to a position in accordance with a target pulley ratio between the primary pulley and the secondary pulley, a servo link connected with the step motor, the movable pulley of the primary pulley, and the shift control valve, and arranged to move the movable pulley of the primary pulley through the shift control valve in accordance with the position of the step motor, an actual pulley ratio sensing section configured to sense or determine an actual pulley ratio between the primary pulley and the secondary pulley, and a control section configured to control the step motor in accordance with the target pulley ratio and the actual pulley ratio sensed by the actual pulley ratio sensing section. The control section includes a target pulley ratio setting section configured to set the target pulley ratio, a normal control section configured to perform a normal control to actuate the step motor at a first speed by using a feedback control including an integral control in accordance with the target pulley ratio and the actual pulley ratio, a high speed control section configured to perform a high speed control to actuate the step motor at a second speed higher than the first speed by an open loop control based on the target pulley ratio, a judgment section configured to judge whether there is a high speed operation request to perform a shift operation at a high speed, and a switch section configured to select the normal control performed by the normal control section at a normal condition, and to switch to the high speed control performed by the high speed control section when a switch start condition is satisfied, the switch start condition including a first condition that the judgment section judges there is the high speed operation request.

In the illustrated embodiment, when there is not the high speed shift request, the shift operation is performed at the normal speed (the first speed) within the constant speed. Accordingly, it is possible to appropriately perform the feedback control by using the simple filter for the feedback. On the other hand, when there is the high speed shift request, the shift operation is performed at the high speed (the second speed) greater than the constant speed. In this case, it is difficult to perform the appropriate control by using the simple filter for the feedback. However, it is possible to perform the rapid shift control by using the open-loop control.

In the control apparatus according to the embodiment, the judgment section judges that there is the high speed operation request when a deviation between the target pulley ratio set by the target pulley ratio setting section and the actual pulley ratio sensed by the actual pulley ratio sensing section is equal to or greater than a first predetermined value.

Accordingly, it is possible to surely judge that there is the high speed shift request and the shift width is equal to or greater than the predetermined reference value, from deviation $\Delta$IP between target pulley ratio IPt and actual pulley ratio IPr (=IPt−IPr).

In the control apparatus according to the embodiment, the switch start condition includes a second condition that a vehicle speed is equal to or greater than a predetermined vehicle speed. The switch start condition includes a third condition that a load condition of an engine connected with the primary pulley is equal to or greater than a predetermined load.

Accordingly, it is possible to surely prevent the belt slippage which tends to occur when the shift is performed at the high speed at the low running speed. Furthermore, it is possible to surely judge that there is the high speed operation request and the acceleration request, from the load condition of the engine connected with the rotation input side.

Accordingly, it is possible to surely prevent the belt slippage which tends to occur when the shift is performed at the high speed at the low running speed. Furthermore, it is possible to surely judge that there is the high speed operation request and the acceleration request, from the load condition of the engine connected with the rotation input side.

In the control apparatus according to the embodiment, the switching section switches from the high speed control performed by the high speed control section to the normal control performed by the normal control section when the deviation between the target pulley ratio set by the target pulley ratio setting section, and the actual pulley ratio sensed by the actual pulley ratio sensing section becomes equal to or smaller than a second predetermined value.

In the illustrated example, when the shift at the second speed is shortly terminated, the shift speed is varied to the first speed smaller than the second speed. Accordingly, the transmission gear ratio does not exceed target pulley ratio ipt by the shift operation at the high speed, and it is possible to perform the smooth shift control.

In the control apparatus according to the embodiment, the normal control section includes a compensator configured to compensate a response delay of the step motor, and to have a time constant set in accordance with the first speed.

In the illustrated example, the signal processing circuit of the normal control section is provided with the compensator configured to compensate the response delay of the step motor. The compensator is provided with the time constant set in accordance with the first speed. The compensator sets the target pulley ratio which is linearly increased in accordance with the time constant set in accordance with the shift speed request. Accordingly, it is possible to decrease the deviation between the target pulley ratio and the actual pulley ratio ipr by the response delay of actual pulley ratio ipr. Therefore, it is possible to decrease the overshoot of actual pulley ratio ipr, and to perform the smooth shift by the improvement of the responsiveness of actual pulley ratio ipr.

In the control apparatus according to the embodiment, the control apparatus further comprises a secondary pressure regulating valve configured to control an engagement pressure between the belt and each of the primary pulley and the secondary pulley and the belt by regulating a secondary hydraulic pressure acting on the movable pulley of the secondary pulley; and the control section is configured to increase the secondary pressure through the secondary pressure regulating valve when a secondary pressure increase start condition is satisfied, the secondary pressure increase start condition including the first condition that the judgment section judges that there is the high speed operation request.

In the illustrated example, the control section increases the secondary pressure through the secondary pressure regulating valve when the secondary pressure increase start condition is satisfied, and accordingly it is possible to increase the difference of the thrust, and to surely perform the shift at the high speed.

This application is based on a prior Japanese Patent Application No. 2005-317645. The entire contents of the Japanese Patent Application No. 2005-317645 with a filing date of Oct. 31, 2005 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for an automatic transmission of a vehicle, the control apparatus comprising:
    a primary pulley including a movable pulley, the primary pulley being connected with an input;
    a secondary pulley including a movable pulley, the secondary pulley being connected with an output;
    a belt wound around the primary pulley and the secondary pulley;
    a shift control valve configured to regulate a hydraulic pressure acting on the movable pulley of the primary pulley;
    a step motor configured to be moved to a position in accordance with a target pulley ratio between the primary pulley and the secondary pulley;
    a servo link connected to the step motor, the movable pulley of the primary pulley, and the shift control valve, and arranged to move the movable pulley of the primary pulley through the shift control valve in accordance with the position of the step motor;
    an actual pulley ratio sensing section configured to sense an actual pulley ratio between the primary pulley and the secondary pulley; and
    a control section configured to control the step motor in accordance with the target pulley ratio and the actual pulley ratio sensed by the actual pulley ratio sensing section, the control section including:
        a target pulley ratio setting section configured to set the target pulley ratio;
        a normal control section configured to perform a normal control to actuate the step motor at a first speed by using a feedback control including an integral control in accordance with the target pulley ratio and the actual pulley ratio;
        a high speed control section configured to perform a high speed control to actuate the step motor at a second speed higher than the first speed by an open loop control based on the target pulley ratio;
        a judgment section configured to judge whether there is a high speed operation request to perform a shift operation at a high speed; and
        a switch section configured to select the normal control performed by the normal control section at a normal condition, and to switch to the high speed control performed by the high speed control section when a switch start condition is satisfied, the switch start condition including a first condition that the judgment section judges there is the high speed operation request.

2. The control apparatus as claimed in claim 1, wherein the judgment section judges that there is the high speed operation request when a deviation between the target pulley ratio set by the target pulley ratio setting section and the actual pulley ratio sensed by the actual pulley ratio sensing section is equal to or greater than a first predetermined value.

3. The control apparatus as claimed in claim 1, wherein the switch start condition includes a second condition that a vehicle speed is equal to or greater than a predetermined vehicle speed.

4. The control apparatus as claimed in claim 1, wherein the switch start condition includes a third condition that a load of an engine connected with the primary pulley is equal to or greater than a predetermined load.

5. The control apparatus as claimed in claim 3, wherein the switch start condition includes a third condition that a load of an engine connected with the primary pulley is equal to or greater than a predetermined load.

6. The control apparatus as claimed in claim 2, wherein the switching section switches from the high speed control performed by the high speed control section to the normal control performed by the normal control section when the deviation between the target pulley ratio set by the target pulley ratio setting section, and the actual pulley ratio sensed by the actual pulley ratio sensing section becomes equal to or smaller than a second predetermined value.

7. The control apparatus as claimed in claim 1, wherein the normal control section includes a compensator configured to compensate a response delay of the step motor, and to have a time constant set in accordance with the first speed.

8. The control apparatus as claimed in claim 1, wherein the control apparatus further comprises a secondary pressure regulating valve configured to control an engagement pressure between the belt and each of the primary pulley and the secondary pulley and the belt by regulating a secondary hydraulic pressure acting on the movable pulley of the secondary pulley; and the control section is configured to increase the secondary hydraulic pressure through the secondary pressure regulating valve when a secondary pressure increase start condition is satisfied, the secondary pressure increase start condition including the first condition that the judgment section judges that there is the high speed operation request.

9. A control method for an automatic transmission of a vehicle including: a primary pulley including a movable pulley, the primary pulley being connected with an input, a secondary pulley including a movable pulley, the secondary pulley being connected with an output, a belt wound around the primary pulley and the secondary pulley, a shift control valve configured to regulate a hydraulic pressure acting on the movable pulley of the primary pulley, a step motor configured to be moved to a position in accordance with a target pulley ratio between the primary pulley and the secondary pulley, a servo link connected to the step motor, the movable pulley of the primary pulley, and the shift control valve, and arranged to move the movable pulley of the primary pulley through the shift control valve in accordance with the position of the step motor, and an actual pulley ratio sensing section configured to sense an actual pulley ratio between the primary pulley and the secondary pulley, the control method comprising:

controlling the step motor in accordance with the target pulley ratio and the actual pulley ratio sensed by the actual pulley ratio sensing section;

setting the target pulley ratio;

performing a normal control to actuate the step motor at a first speed by using a feedback control including an integral control in accordance with the target pulley ratio and the actual pulley ratio;

performing a high speed control to actuate the step motor at a second speed higher than the first speed by an open loop control based on the target pulley ratio;

judging whether there is a high speed operation request to perform a shift operation at a high speed; and selecting the normal control performed by the normal control section at a normal condition, and to switch to the high speed control performed by the high speed control section when a switch start condition is satisfied, the switch start condition including a first condition that the judgment section judges there is the high speed operation request.

* * * * *